United States Patent Office 3,507,787
Patented Apr. 21, 1970

3,507,787
METHOD OF FLOCCULATING AN AQUEOUS SUSPENSION OF SOLID INORGANIC PARTICLES
Richard J. Pratt, Flossmoor, and Richard K. Diefenbach, Park Forest, Ill., assignors to Sinclair Research, Inc., New York, N.Y., a corporation of Delaware
No Drawing. Original application Nov. 7, 1966, Ser. No. 592,329. Divided and this application June 2, 1969, Ser. No. 839,131
Int. Cl. B01d 21/01
U.S. Cl. 210—54                    10 Claims

ABSTRACT OF THE DISCLOSURE

Cationic water-soluble, quarternary ammonium salts of a tertiary amine-containing amidic reaction product of a polyamine and polymer of a polymerizable vinyl monomer and a dicarboxyl compound are provided wherein at least 80 percent of the dicarboxyl groups are imidized and at least 30 percent of the teritiary amine groups are quaternized. They are useful to flocculate an aqueous suspension of solid inorganic particles.

---

This is a division of of application Ser. No. 592,329, filed Nov. 7, 1966, and now abandoned.

This invention relates to a method for flocculating aqueous suspensions of finely-divided, solid inorganic particles. Particularly, the invention relates to the flocculation of such aqueous suspensions by the application thereto of a novel, water-soluble cationic polymer product which is a quaternary ammonium salt of a polyimide-amine.

Various methods for flocculating aqueous suspensions of finely-divided, solid inorganic particles are known which employ an agglomerating material or flocculant. These known methods, however, have usually been restricted to use in mineral processing and water treatment because of several disadvantages of the flocculants employed. Many of the known flocculants have one or more of the following disadvantages:

(1) Difficult to dissolve.
(2) Low solids solutions have very high viscosities.
(3) Easily attacked by microorganisms.
(4) Are adversely affected by heavy metal ions such as $Zn^{++}$, $Ca^{++}$, $Mg^{++}$ $Fe^{+++}$, $Al^{+++}$.
(5) Undergo slow hydrolysis in water.
(6) Highly alkaline conditions reduce their effectiveness.
(7) Must be used in high dosage, e.g., about 500-1000 parts per million to be effective.
(8) Are expensive.
(9) Have weak adsorbing power for particle surfaces.
(10) Effect unstable suspensions which are easily resuspended.
(11) Insoluble at neutral or near neutral pH.

The novel flocculant employed in the process of the invention is soluble in the neutral pH range (pH 6-8) as well is in the higher and lower pH ranges. Solubility at neutral or near neutral pH is highly desirable since this range is encountered most often in actual practice. Moreover, the flocculant of the invention is not prone to precipitation by heavy metal ions which reduce the flocculant's effectiveness has a strong adsorbing power for particle surfaces, and is hydrolytically stable. In addition to waste treatment and water purification systems, the flocculant of the invention can be employed to flocculate finely divided inorganic solid particles in the areas of mineral processing, pulp and paper processing, chemical processing and petroleum processing.

The polyimide-amines quaternized to provide the novel flocculants used in the process of the invention are tertiary amine-containing imidic reaction products of a polyamine and a polymer of a polymerizable vinyl monomer and a dicarboxyl compound. Suitable polymers of a vinyl monomer and a dicarboxyl compound for preparing the flocculant of this invention are those having an average molecular weight in the range of about 400 to 100,000, preferably about 600 to 50,000, and containing a molar ratio of vinyl monomer to dicarboxyl monomer of about 1 to 4:1, preferably about 1 to 3:1. Suitable vinyl monomers are polymerizable monovinyl compounds of 2 to about 12 carbon atoms and include, for instance, alpha-olefins such as ethylene, propylene, isobutylene, butylene, pentylene, hexylene, heptylene, octylene, nonylene, decylene and dodecylene; vinyl ethers such as methylvinyl ether, ethylvinyl ether, n-butylvinyl ether and isobutylvinyl ether; and vinyl aromatics such as vinyltoluene, styrene and the like. Mixtures of, as well as single, vinyl monomers are contemplated and intended to be included therein and in the claims by the terminology "monovinyl compound." The preferred monomer is styrene.

The polymerizable dicarboxyl compounds copolymerized with the vinyl monomers include monoethylenically unsaturated compounds having at least two carboxyl groups structurally oriented such that both will react with the same amino group of the polyamine to form an imide. Suitable dicarboxyl monomers contain about 4 to 10 carbon atoms and often have a molecular weight in the range of about 80 to 200. Such dicarboxyl monomers include substituted and unsubstituted monoethylenically unsaturated dicarboxylic acids and esters thereof, such as maleic acid, dimethylmaleic acid, 2-pentenedioic acid, 2-hexenedioic acid, 3-hexenedioic acid, methyl maleate, ethyl maleate, etc.; substituted and unsubstituted ethylenically unsatured cyclic anhydrides such as maleic anhydride, methyl maleic anhydride, ethyl maleic anhydride, itaconic anhydride, etc.; and like compounds.

The vinyl monomer-dicarboxylic compound polymer can be prepared by known methods. A preferred method is by solution polymerization where the monomers are polymerized in a suitable solvent employing as the polymerization catalyst a free-radical catalyst, such as a peroxide, preferably benzoyl peroxide or dicumyl peroxide, at a temperature of about 75 to 300° C. or more. Suitable solvents include the aromatic hydrocarbon solvents, such as cumene, p-cymene, xylene, toluene, etc. Other suitable solvents are the ketones, such as methylethyl ketone.

The preferred manner of carrying out the polymerization is by what is known as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the polymer formed is usually soluble in the solvent media so that recovery of the product necessitates a stripping operation.

The polyamines to be reacted with the vinyl monomer-dicarboxyl compound polymer to produce the flocculating agent of the present invention include those represented by the following structural formula:

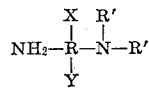

where X is hydrogen or

Y is hydrogen or

R is alkylene, including cycloalkylenes, of 1 to about 10, preferably about 2 to 6 carbon atoms, and R' is a monovalent hydrocarbon radical, preferably alkyl, including cycloalkyl, of 1 to about 8, preferably 1 to 2 carbon atoms. Thus, suitable polyamines include dihydrocarbylaminoalkylamines, bis(dihydrocarbylamino)alkylamines and tris(dihydrocarbylamino)alkylamines. As examples of those polyamines containing only one tertiary amine group, may be mentioned dimethylaminomethylamine, dimethylaminoethylamine, dimethylaminopropylamine, dimethylaminobutylamine, diethylaminopropylamine, diethylaminoamylamine, dipropylaminopropylamine, methylpropylaminoamylamine, propylbutylaminoethylamine, etc.

As examples of suitable polyamines containing two or three tertiary amine groups may be mentioned, bis(dimethylamino)propylamine, bis(dimethylamino) ethylamine, tris(diethylamino)amylamine, bis(methylpropylamino)buytlamine, tris(methylethylamino)butylamine, etc.

Reaction of the polyamine with the vinyl monomer-dicarboxyl compound polymer can be effected by heating at imide-forming temperatures, either with or without catalyst, a mixture of the reactants. The ratio of reactants and the duration of the reaction can be controlled so as to effect imidation of about 80 to 100, preferably at least about 90 or even 95 percent of the maleic anhydride units in the polymer. A temperature of about 125° C. is usually necessary to effect the imidation reaction but temperatures above about 350° C. are generally not utilized in that they may cause undesirable side reactions or degradation of the product. Preferred reaction temperatures are in the range of about 150 to 200° C. The reaction may be carried out in bulk or in the presence of a suitable mutual solvent for the reactants. Total reaction time will vary depending on the particular reactants employed, but will usually range from about 1 to 5 hours.

The quaternary ammonium salt of the imidic reaction product can be prepared by treatment of the polymeric imide with an alkyl halide. Suitable alkyl halides include, for instance, the monohalogenated alkanes, including cycloalkanes, having 1 to about 4, preferably 1 to 3 carbon atoms, the halogen having an atomic number of 17 to 53, i.e., being chlorine, bromine or iodine. Quaternization can be effected by known methods such as by contacting, for instance at room temperatures, the imidic reaction product with the alkyl halide in solution in a suitable mutual solvent. Elevated temperatures, for example, up to about 100° C. or more, can be employed if suitable equipment, for example a Dry Ice condenser, is used to maintain the relatively low boiling alkyl halide in solution. As suitable solvents, may be mentioned ketones, e.g., acetone and methylethyl ketone; aromatic hydrocarbons, e.g., benzene and toluene; ethers, e.g., diethyl ether and methylphenyl ether; etc. Reaction times depend upon reactant proportions, reaction temperature, the desired extent of quaternization, etc., and will vary anywhere from a few minutes to several hours, or even days. At room temperature the quaternization reaction will generally be complete within a period of a few hours to overnight. The quaternary salt used in the method of the present invention is often one in which about 30 to 100, often about 50 to 80 percent of the total tertiary amine, i.e., dihydrocarbylamino groups are quaternized with the alkyl halide.

The foregoing discussion of the preparation of the polymeric imide and its quaternary salt may be better understood by reference to the chemical equation presented below, wherein dimethylaminopropylamine exemplifies the polyamine and methyl iodide is used as the quaternizing agent. Thus, the reaction at elevated temperatures between for example, a styrene-maleic anhydride polymer and dimethylaminopropylamine proceeds at the maleic anhydride unit of the polymer to form an imide as follows:

(1) 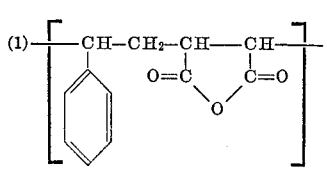 + $NH_2-CH_2-CH_2-CH_2-N(CH_3)_2$ $\xrightarrow{\Delta}$ 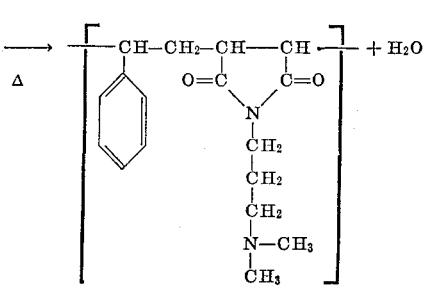 + $H_2O$ Subsequent reaction of the dimethylaminopropylimide of the styrene-maleic anhydride polymer (product of Equation 1) with methyl iodide results in the formation of a quaternary salt of the imide as follows:

(2) 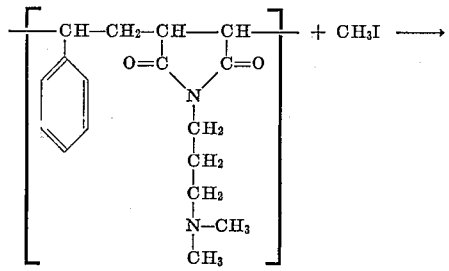 + $CH_3I$ ⟶

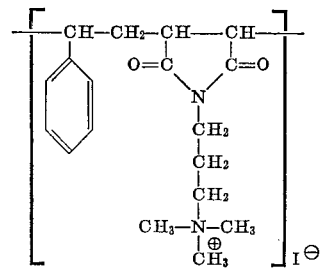

The process of the invention may be used to flocculate finely divided inorganic solid materials including, for instance, clay, metal oxides such as iron oxides, zinc oxides, etc. The materials in finely-divided form are generally less than about 25 microns in size.

The amount of flocculant employed in the process of the invention may vary depending upon the amount and the character of the inorganic solid or solids to be flocculated but in all cases will be that sufficient to flocculate the suspended inorganic particles. Often at least about 1 part of flocculant polymer per ten thousand parts by weight of suspended inorganic solid, is employed. For economic reasons, the flocculant used in the process of the invention is preferably applied to the suspended inorganic solids as an aqueous solution containing, say at least about 0.005, preferably 0.02 to 0.1 weight percent of the flocculant. The solubility of the flocculant of the present invention in aqueous media is excellent over an extremely wide pH range; thus, the flocculant solution may be acidic, basic or neutral.

The following examples are included to further illustrate our invention and is not to be considered limiting.

EXAMPLE I

Preparation of quaternary

One hundred grams of a styrene-maleic anhydride copolymer having a 3 to 1 styrene to maleic anhydride molar ratio and an average molecular weight of about 1900, were slurried with 300 grams of 3-dimethylaminopropylamine at room temperature until the resin particles were finely divided in the amine. Heat was applied gradually until the solid dissolved. The solution was then stirred under gentle reflux for one hour and then subjected to distillation until the reaction product reached 200° C. A 300 mm. vacuum was applied to remove the last traces of free amine. The imide-amine product was analyzed for nitrogen content. The result is listed in Table I.

The above imide-amine product was dissolved in 800 ml. of technical grade acetone and treated with gaseous methyl chloride. In order to prevent excessive loss of methyl chloride a Dry Ice condenser was used to return liquid methyl chloride to the reaction medium. The quaternary amine salt thus produced was analyzed for chlorine content. The result is listed in Table I. Table I also contains data obtained from similar analyses of imide-amine and quaternary amine salts prepared according to the procedure of the above example using dimethylaminopropylamine and various styrene-maleic anhydride polymers, lettered A–E.

TABLE I.—ANALYSES OF IMIDE-AMINE AND QUATERNARY

| Styrene-maleic anhydride polymer | Imide-amine, percent nitrogen found [1] | Quaternary, percent chlorine [2] |
|---|---|---|
| (A) 3/1 styrene-maleic anhydride molar ratio; about 1,900 molecular wt. | 5.6 | 3.9[57%] |
| (B) 1/1 styrene-maleic anhydride molar ratio; about 1,500 molecular wt. | 9.3 | 6.4[57%] |
| (C) 1/1 styrene-maleic anhydride molar ratio; about 8,000 molecular wt. | 9.6 | 4.3[38%] |
| (D) 1/1 styrene-maleic anhydride molar ratio; about 20,000 molecular wt. | 9.3 | 4.7[42%] |
| (E) 1/1 styrene-maleic anhydride molar ratio; about 43,000 molecular wt. | 9.3 | 10.3[92%] |

[1] All experimental values are 95% of theory.
[2] Bracketed values indicate percent of conversion of imide-amine to quaternary.

EXAMPLE II

Procedure for testing effectiveness of quaternary

A 1% Hydrite 121 (Georgia kaolin) clay suspension was prepared by shaking 2.0 grams of clay with 198 grams of water in a 200 ml. graduate. The suspension was allowed to age 24 hours and then was adjusted to pH 7.3 with dilute ammonium hydroxide. This suspension contained 10,000 p.p.m. solids.

A solution of quaternary was prepared by shaking 100 milligrams of finely ground dry quaternary with 100 milliliters of distilled water.

A 0.05 ml. aliquot of this solution was added to the above suspension. The graduate was stoppered and tilted nearly 180° from its upright position and back. This was repeated two more times. The tilting must be fast enough to mix the suspension but not form bubbles at the surface of the liquid. After placing the graduate in its original upright position, the settling time was recorded for the solid front to settle from the surface of the liquid (200 ml. mark) to the 100 ml. mark. A sample of supernate was withdrawn and placed in a spectrophotometer where percent transmittance (clarity) values were determined at 525 mu. The above agitation and measurements were carried out until an increment of additional flocculant solution produced no further improvement in clarity. Table II summarizes the test results for all the quaternized polyamide-amines prepared according to the procedure of Example I using styrene-maleic anhydride polymers A–E. Table III contains the results of similar tests employing well-known commercial flocculating agents which are based upon acrylamide polymers and are non-quaternary ammonium salts.

TABLE II.—RESULTS FROM CLAY FLOCCULATION BY QUATERNARY

| Styrene-maleic anhydride polymer | Imide-amine quaternary dose (p.p.m.) [1] | Settling time | Percent Transmittance [2] |
|---|---|---|---|
| A | 400 | 106 secs | 24 [96] |
| B | 800 | 180 secs | 30 [97] |
| C | 400 | 80 secs | 40 [98] |
| D | 400 | 53 secs | 67 [99.7] |
| E | 400 | 39 secs | 79 [99.9] |
| Untreated | | 24 hours | Too turbid to read |

[1] P.p.m. (parts per million); 0.4 ml. of 0.1% solution Polymer A Imide-Amine Quaternary was required to give 24% transmittance. Additional quantities of flocculating agent showed no improvement.
[2] Bracketed values indicate percent of suspension actually settled by flocculation.

TABLE III.—RESULTS OF COMMERCIAL FLOCCULATING AGENTS ON CLAY SUSPENSION

| Commercial flocculant | Dosage (p.p.m.) | Settling time (secs.) | Percent transmittance |
|---|---|---|---|
| A | 400 | 56 | 63 |
| B | 800 | 10 | 70 |
| C | 800 | 7 | 80 |
| D | 800 | 60 | 75 |

The data shown in Table II demonstrate the strong adsorbing power of the quaternary for inorganic particles. The quaternary settled at least 95% of the solids suspended while maintaining rapid settling time.

It is claimed:
1. A method of flocculating an aqueous suspension of solid inorganic particles which comprises applying to said suspension a cationic water-soluble quaternary ammonium salt of a tertiary amine-containing, imidic reaction product of (A) a vinyl monomer-dicarboxyl compound polymer having an average molecular weight of about 400 to 100,000 and a molar ratio of vinyl monomer to dicarboxyl compound of about 1:1 to 4:1, said vinyl monomer being a monovinyl compound of 2 to about 12 carbon atoms and said dicarboxyl compound having about 4 to 10 carbon atoms, and (B) a polyamine corresponding to the formula:

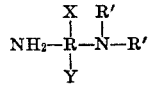

where X is hydrogen or

Y is hydrogen or

R is alkylene of 1 to about 10 carbon atoms and R' is monovalent hydrocarbon of 1 to about 8 carbon atoms, about 80 to 100 percent of the dicarboxyl units of said polymer being imidated with said polyamine, and about 30 to 100 percent of the tertiary amine groups of said imidic reaction product being quaternized.

2. The method of claim 1 wherein the vinyl monomer is styrene.

3. The method of claim 2 wherein the dicarboxyl compound is maleic anhydride.

4. The method of claim 3 wherein the polyamine is dialkylaminoalkylamine.

5. The method of claim 4 wherein the dialkylaminoalkylamine is dimethylaminopropylamine.

6. The method of claim 1 wherein the quaternary ammonium salt is applied as an aqueous solution containing at least about 0.005 weight percent of said salt.

7. The method of claim 1 wherein the tertiary amine-containing, imidic reaction product is quaternized with a monohalogenated alkane having 1 to about 4 carbon atoms, the halogen having an atomic number of 17 to 53.

8. The method of claim 7 wherein about 30 to 100 percent of the tertiary amine groups are quaternized with the monohalogenated alkane.

9. The method of claim 8 wherein the monohalogenated alkane is methyl chloride.

10. A method of flocculating an aqueous suspension of solid inorganic particles which comprises applying to said suspension an aqueous solution containing at least about 0.005 weight percent of a cationic water-soluble quaternary ammonium salt of a tertiary amine-containing, imidic reaction product of (A) a styrene-maleic anhydride polymer having an average molecular weight of about 400 to 100,000 and a molar ratio of styrene to maleic anhydride of about 1:1 to 4:1 and (B) a polyamine corresponding to the formula:

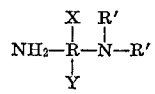

where X is hydrogen or

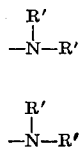

Y is hydrogen or $$-\underset{\underset{R'}{|}}{N}-R'$$

R is alkylene of about 2 to 6 carbon atoms and R' is an alkyl radical of 1 to 2 carbon atoms; at least about 90 percent of the maleic anhydride units of said polymer being imidated with said polyamine; and about 30 to 100 percent of the tertiary amine groups of said imidic reaction product being quaternized with a monohalogenated alkane having 1 to 3 carbon atoms, the halogen having an atomic number of 17 to 53.

References Cited

UNITED STATES PATENTS 3,157,595   11/1964   Johnson et al.
3,398,092   8/1968   Fields et al.

MICHAEL E. ROGERS, Primary Examiner

U.S. Cl. X.R.

260—78.5